July 12, 1966 J. A. JACKSON 3,260,378

CONTROL APPARATUS

Filed June 30, 1964 3 Sheets-Sheet 1

Inventor
John Alfred Jackson

By
Browne Schuyler and Beveridge
Attorney

Inventor
John Alfred Jackson
By
Browne Schuyler and Beveridge
Attorney

July 12, 1966 J. A. JACKSON 3,260,378

CONTROL APPARATUS

Filed June 30, 1964 3 Sheets-Sheet 3

Inventor
John Alfred Jackson
By
Browne Schuyler and Beveridge
Attorney 3,260,378
CONTROL APPARATUS John A. Jackson, Southend-on-Sea, Essex, England, assignor to E. K. Cole Limited, Southend-on-Sea, Essex, England Filed June 30, 1964, Ser. No. 379,077
Claims priority, application Great Britain, July 4, 1963, 26,478/63
4 Claims. (Cl. 214—1.6)

This invention relates to control apparatus of the type used in machines in which a body on which an operation is to be performed is adapted to be advanced at either a slow speed or a relatively faster speed according to a programme recorded on a magnetic track so that the body may be brought into a predetermined position for the operation to take place. The machine may be, for example, a paper guillotine. To ensure that the body is stopped at the correct positions, it has previously been proposed to cause a signal on the track to be received by a first head to cause the rate of feed of the body to be reduced, the signal, after a predetermined interval, being received by a second head to cause the body to be stopped. In such a system a separate amplifier was provided for the output of each head and also, if a subsequent signal passed the first head before the body stopped, means had to be employed to prevent the body from restarting at its normal or fast speed. Such a means may be a pulse store in which a pulse is stored for each signal passing the first head, a pulse being removed from the store on completion of each operation on the body. The magnetic track may be of any known type, e.g. of magnetic tape or magnetic wire.

A feature of the present invention is a control system of the said type, in which prior to the body being advanced, a head is caused to be moved from a first position towards a second position to scan all or part of the length of track between said positions, the presence or absence of a signal on that length of the track determining the speed at which the body is advanced and the position at which the head is brought to rest.

A further feature of the present invention is a control apparatus as aforesaid arranged so that if, during the movement of the head from the first position towards the second position, the head receives a signal recorded on the track, the body is advanced at its slow speed and the head is returned to the first position, whereas if no such signal is received, the head is brought to rest at the second position and the body is advanced at its fast speed until the head receives a signal recorded on the track, whereupon the advance of the body is slowed down and the head is returned to its first position. It is arranged that the head is returned to the first position at a faster speed than that of the track so that the head is in position once again to receive the same signal recorded on the track to stop the body.

In a preferred form of the invention the movement of the head is controlled by two solenoids, one for each direction of movement of the head.

Figure 1:
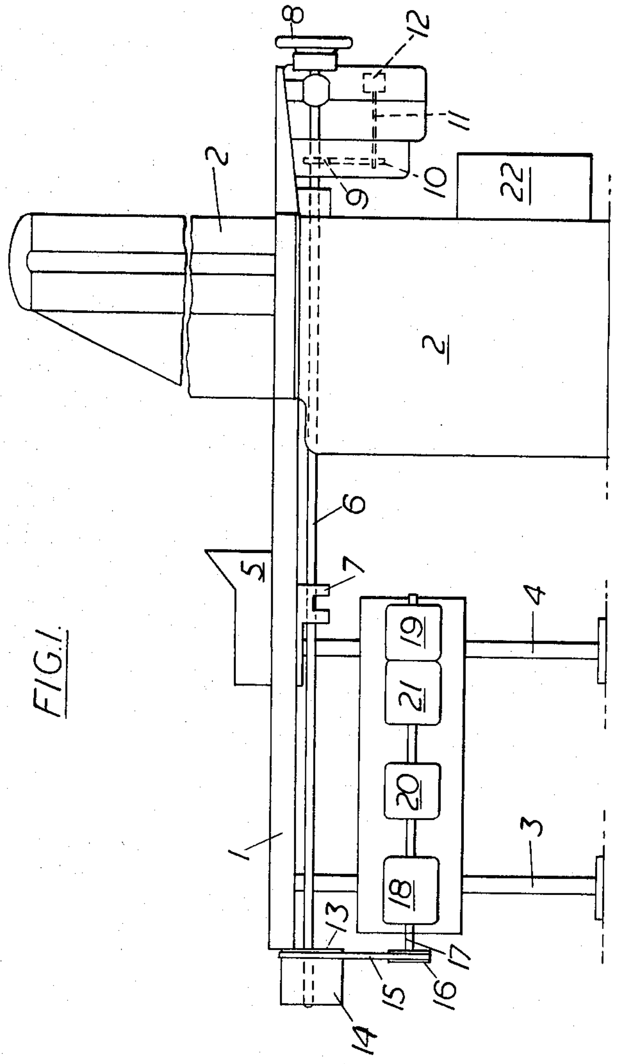
Figure 2:
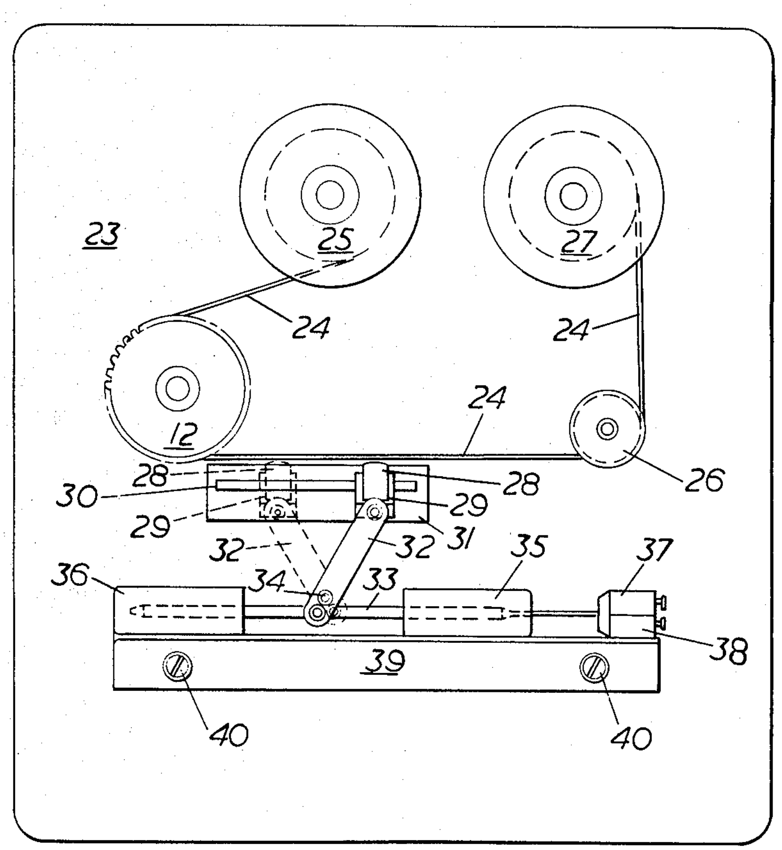
Figure 3:
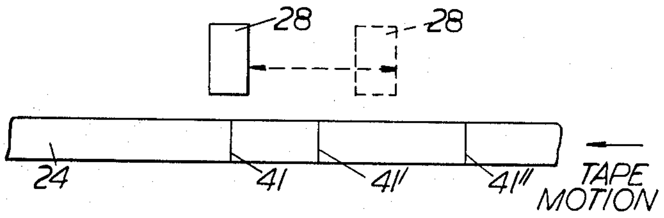
Figure 4:
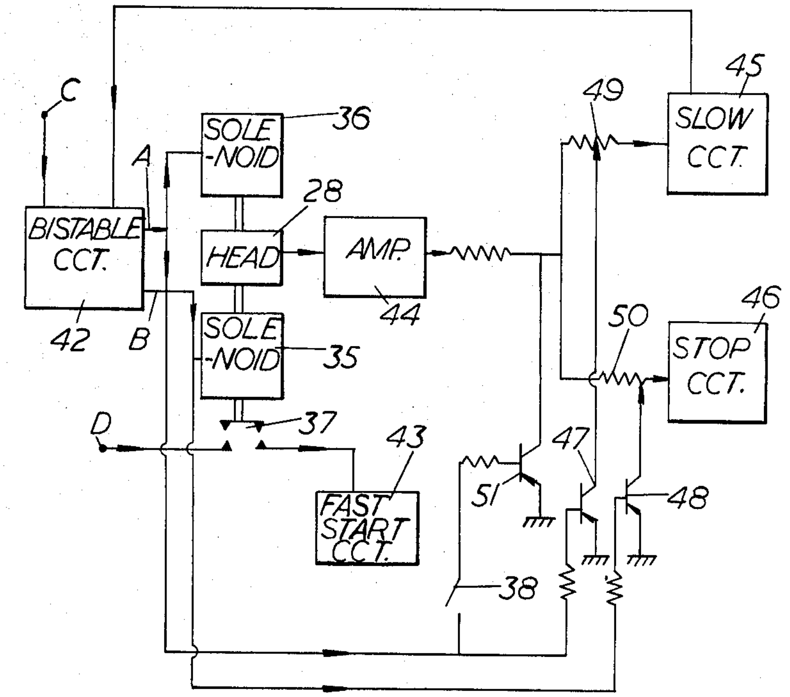

The above and other features of the invention will be more readily understood by a perusal of the following description having reference to the accompanying drawings in which FIGURE 1 is a side elevation of a paper cutting guillotine embodying the present invention, FIGURE 2 is a diagram showing in more detail a part of FIGURE 1, FIGURE 3 is a diagram used to illustrate a principle of the invention, and FIGURE 4 is a circuit diagram, partly in block schematic, of a circuit which may be used to control the operation of the backfence shown in FIGURE 1.

In FIGURE 1 the paper cutting guillotine comprises a work bed 1 mounted between side frames, one of which is shown at 2. The work bed 1 is provided with additional supports at 3 and 4. A cutting knife and clamp (not shown) are positioned above the work bed 1 and between the side frames. A backfence 5 is adapted to slide over the work bed 1 to advance a stack of paper towards the cutting knife. The backfence 5 is driven by a feed-screw 6 which engages with an extension 7 from the underside of the backfence. The front end of the feed-screw 6 is provided with a hand-wheel 8 for manual operation of the backfence 5. The feed-screw 6 is mechanically coupled through a reduction gearing comprising gears 9 and 10 to a driving shaft 11. The shaft 11 drives a sprocket wheel 12 for a magnetic tape transport mechanism which is shown in detail in FIGURE 2. The rear end of the feed-screw 6 passes through a pulley 13 to a brake 14. A driving belt 15 passes round the pulley 13 and a pulley 16 mounted on a shaft 17. The shaft is adapted to be driven at either a fast speed by a motor 18 or at a relatively slower speed by a motor 19. The usual clutch and gear-box for the motors 18 and 19 are shown at 20 and 21 respectively. Electronic circuitry for controlling the operation of the backfence 5 in dependence on the programme recorded on the magnetic tape of the transport mechanism is housed in a unit 22 mounted on the side frame 2.

In the magnetic tape transport mechanism of FIGURE 2, the sprocket wheel 12 is mounted on a plate 23. A magnetic tape 24 is fed from a pay-out spool 25 via the sprocket wheel 12 and a guide wheel 26 to a take-up spool 27. The magnetic tape 24 passes over the face of a head 28 housed in a holder 29 which is adapted to pass along a guide 30 in a plate 31. The holder 29 is mechanically coupled to one end of a lever 32, the other end of which is connected to a rod 33. The lever 32 is pivoted at 34. The rod 33 is adapted to be moved by two solenoids 35 and 36 so that the head 28 may be caused to assume either of the positions shown, the solenoid 35 being energised to move the head 28 to the left in FIGURE 1 while the solenoid 36 is energised to move the head in the reverse direction. The rod 33 is mechanically coupled to two micro-switches 37 and 38 whose operation is controlled by the solenoid 35 as will be described with reference to FIGURE 4. The solenoids 35 and 36 and the micro-switches 37 and 38 are assembled on a bracket 39 which is mounted on the plate 23 by two bolts 40.

In FIGURE 3 the magnetic tape 24 has a number of marks such as 41, 41' and 41'' recorded thereon. The marks form part of a programme recorded on the tape and are used to control the advance in steps of the paper in the guillotine of FIGURE 1 so that an operation may be carried out on the paper at the end of each step. In order that the paper may be brought to rest at the desired positions we arrange to slow-down the advance of the paper prior to a stop position being reached. Accordingly we have arranged that the head 28 be moved from the position shown in full lines( the first position) towards the position represented by dotted lines (the second position) before the paper is advanced at the commencement of a programme or after an operation has been carried out on the paper. If during this movement the head passes a mark such as 41' on the tape, the pulse received by the head is used to cause the paper to be advanced at the slow speed. If no such pulse is received the head is brought to rest at the second position and the paper is advanced at the fast speed until such time as the head receives a pulse due to, say, the mark 41'' to slow down the work. It is arranged that when the head 28 receives a pulse due to a mark such as 41' and 41'', the head is returned to the first position at such a speed that the head may again receive a pulse when that mark repasses the stationary head to stop the paper so that an operation may be carried out thereon. The output of the head is rendered inoperative during its return movement to suppress the output of the head when it again receives a pulse due to the mark which initially caused a slowing down of the paper. The spacing between the positions of the head is arranged to be sufficient to allow the paper to be slowed down to a predetermined slower speed prior to the paper being stopped. Normally we arrange that the tape moves at twice the speed of the paper and in such a case we have found that a spacing of 1.5 inches between the head positions is satisfactory. One method by which the pulses received by the head 3 may be used to control the movement of the paper will now be described with reference to FIGURE 4.

The operation of the two solenoids 35 and 36 is controlled by a bistable circuit 42 having two outputs A and B, the output A being connected to the solenoid 36 while the output B is connected to the solenoid 35. The bistable circuit 42 is provided with an input terminal C for purposes which will be explained hereinafter. The switch 37, which is mechanically coupled to the solenoid 35, is connected in the input of a fast start circuit 43 and is closed when the head reaches the second position. This circuit is provided with an input terminal D to which is applied a constant voltage of suitable amplitude derived from any convenient source and is used to control the operation of the motor 18 so that when the switch 37 is closed, the motor 18 is operated and the backfence is driven at the fast speed. The output of the head 28 is amplified in 44 and may be fed to either a slow circuit 45 or a stop circuit 46. This is determined by the state of operation of two transistors 47 and 48, the collector of 47 being connected to a resistor 49 in the input of 45 while the collector of 48 is connected to a resistor 50 in the input of 46. The slow circuit 45 controls the operation of the motors 18 and 19 so that when a signal is received by 45, the fast motor 18 is stopped and the backfence is driven by the slow motor 19. When a signal is received by the stop circuit 46, the motor 19 is stopped and the brake 14 is applied. The operation of the transistors 47 and 48 is controlled by the bistable circuit 42, the output A of which is connected to the base of 47 while the base of 48 is connected to the output B of the bistable circuit. It is sometimes required that the output of 44 be prevented from reaching either 45 or 46. This is provided for by a transistor 51 whose collector is connected to the output circuit of 44. The switch 38 is connected in the base circuit of the transistor 51 and is arranged to be operated when the head 28 commences to move from the first position towards the second position. With the switch 38 closed, any output from A of 42 is applied to the base of this transistor.

When it is required that the paper in the guillotine be moved to the next operating position or when a programme of operations is to be commenced, a signal is fed to the terminal C to change the state of operation of 42. In the former case this signal may be derived when a cutting operation is carried out on the paper whereas in the latter case the signal would normally be obtained from the operation of the "start" button (not shown) for the guillotine. When the bistable circuit 42 changes state, an output is provided at B to energise the solenoid 35 and the head 28 is caused to be moved from the first position towards the second position. The output at B also switches on the transistor 48 to prevent signals being fed to the stop circuit 46. Immediately the head 28 commences to move from the first position towards the second position the switch 38 is closed. If any pulse (due to, say, the mark 41' of FIG. 3) is received by the head while it is being moved towards the second position, a signal is fed to the slow circuit 45 to cause the paper in the guillotine to be moved at its slower speed and a pulse is fed from 45 to change the state of operation of the bistable circuit 42. The output of 42 is now provided at A so that the solenoid 36 is energised and the head 28 is arranged to be returned to the first position at a much higher speed than that of the tape. The output A of 42 also switches on the transistors 47 and 51 so that the pulse received by the head 28, due to it repassing the mark on the tape, is prevented from operating either 45 or 46. When the head 28 reaches the first position, the switch 38 is automatically opened, so that when the mark on the tape, which initiated the slow advance of the paper, once again passes the head, a pulse is fed to 46 to stop the paper.

Alternatively, if the head does not receive a pulse during its movement from the first position to the second position, the head is brought to rest at the second position. The switch 37 is closed by the solenoid 35 and the fast forward circuit 43 is energised to cause the paper to be advanced at the fast speed. When the next mark on the tape (say 41'' of FIG. 1) passes 28, a signal is fed to the slow circuit 45, the work is slowed down and the head 28 is returned to the first position as previously described.

Various modifications may be made without exceeding the scope of the invention. For example, the signals recorded on the magnetic tape may be of either the A.C. or D.C. type. Also the magnetic tape may be replaced by, e.g., a magnetic wire.

I claim:

1. In a machine of the type in which the step by step advance of a body to a position where an operation is to be performed thereon is adapted to be controlled by a magnetic track movable step by step in synchronism with said body, discrete programme signals recorded on said track, a magnetic head operatively positioned to react to said signals, means for advancing the body at a slow speed, means for advancing the body at a relatively faster speed, means for moving the head from a first position towards a second position in a backwards direction along the track, means for initiating the movement of the head prior to the advance of the body, means for using a signal received by said head during its backwards movement to initiate the advance of the body at the slow speed, means for bringing said head to rest in the second position, means for retaining said head in the second position in the event of no signal being received by said head during its backwards movement, means for advancing the body at the fast speed when said head is in the second position, means for using a signal received by said head when in the second position to advance the body at the slow speed, means for returning said head to the first position, means for returning said head at a speed in excess of that of the track, means for initiating the said return when the body is advanced at the slow speed, means for stopping the body and means for effecting said stoppage on a signal being received by said head when in the first position.

2. A machine according to claim 1, provided with a first means for moving said head from the first position to the second position and a second means for returning said head to the first position.

3. A machine according to claim 2, comprising a fast start circuit, a first mechanical switch in the input of said circuit, an output circuit for said head, a second mechanical switch in said output circuit, means for mechanically coupling said switches to the first means, means for controlling the operation of said switches by the first means, means for operating said first switch when said head commences to move towards the second position and means for operating said second switch when said head attains the second position.

4. A machine according to claim 2, provided with an electronic switching device, two input terminals for the device, a first signal fed to one of the input terminals when an operation is performed on the body, a second signal fed to the other of the input terminals when the body is advanced at the slow speed, two output terminals for the device, an input circuit for the first means and an input circuit for the second means, means for connecting the input circuit of the first means to one of said output terminals, means for connecting the input circuit of the second means to the other of said output terminals, means for deriving an output signal at one only of said output terminals at any one time, means for using the first and second signals to determine at which output terminal an output signal is derived, means for using the output signal to operate the appropriate one of said first and second means, means for operating said first means when the first signal is fed to the device and means for operating said second means when the second signal is fed to the device.

References Cited by the Examiner

UNITED STATES PATENTS

| | | | |
|---|---|---|---|
| 3,118,334 | 1/1964 | Blaha | 214—1.6 X |
| 3,195,384 | 7/1965 | Barley | 214—1.6 X |

MARVIN A. CHAMPION, *Primary Examiner.*